Patented Nov. 17, 1931

1,832,678

UNITED STATES PATENT OFFICE

PAUL G. WILLETTS, OF WEST HARTFORD, CONNECTICUT, ASSIGNOR TO HARTFORD-EMPIRE COMPANY, OF HARTFORD, CONNECTICUT, A CORPORATION OF DELAWARE

MANUFACTURE OF SILICA-ALUMINA REFRACTORIES

No Drawing. Application filed September 6, 1930. Serial No. 480,271.

This invention relates to the manufacture of refractory blocks, bricks and other objects for use at high temperatures, for general refractory purposes and/or for use in contact with molten glass.

In my prior applications, Serial No. 91,369, filed March 1, 1926, Serial No. 294,601, filed July 20, 1928, Serial No. 294,949, filed July 23, 1928, Serial No. 302,151, filed August 25, 1928, Serial No. 345,614, filed March 8, 1929 and Serial No. 430,459, filed Feb. 21, 1930, I have described and claimed various novel processes and refractory products of the class to which the present application relates, and have set forth in some detail the starting materials and manipulations employed, and the novel and beneficial properties of the products thus produced. The present application is directed to the essential steps of the general process employed in making these various products, all of which are characterized by being made from clays or other starting materials consisting almost entirely of alumina and silica, with only a small admixture of impurities or additions, such as iron and alkalies. The products are also characterized by being composed, as a rule, of two constituents or phases only, namely, a crystalline constituent in the form of numerous microscopic crystals, uniformly distributed in a glassy matrix of high softening point.

The essential steps composing the process of the present invention are the following:

1. *Selection of starting materials.*—The starting materials, as indicated above, are composed principally of silica and alumina, and include relatively pure clays, white bauxite, diaspore, aluminum monohydrate, etc. Among the suitable clays may be mentioned Georgia Klondike white kaolin, mined near McIntyre, Wilkinson County, Georgia, which is a soft, white, non-plastic kaolin; and Georgia G¹ clay, which is a plastic, bauxitic clay, obtainable from the Savannah Kaolin Company at Gordon, Georgia. Potter's flint may be added in cases where it is desired to increase the silica content of the products, and small amounts of feldspar may be added to reduce the maturing temperature of the products for commercial convenience in firing, without unduly increasing the alkali content of the products. The essential feature of this process in respect to the starting materials is that, when they are chosen according to their individual properties and mixed in selected proportions to produce the desired objects, the resulting mixture must contain, by calcined analysis, not over about 1½% of iron oxid plus alkali metal oxids, and should contain about 96% or upwards of silica plus alumina. The presence of a greater amount of iron and akalies or the presence of less than 96% of alumina plus silica, reduces unduly the softening point of the glassy matrix in the final products. For present purposes, the exact ratio between the silica and the alumina in the mixture is not of critical importance, as the benefits of this invention may be realized with mixtures containing a preponderance of alumina or a preponderance of silica.

2. *Preliminary treatment of starting materials.*—The first step in treating the starting materials is to reduce them to impalpable fineness such, for example, as a fineness enabling the material to pass through a standard U. S. 325-mesh screen, which has approximately 325 meshes per linear inch.

3. *Grog preparation.*—The finely ground starting materials to be used as grog are mixed intimately in the presence of water, by well-known mixing methods, such as blunging, pugging and filter-pressing, and the mixed material is formed into pieces suitable for handling and is fired to a temperature at least 2700° F. At this temperature the material undergoes a maturing conversion with the formation of microscopic crystals which typically consist of mullite ($3Al_2O_3.2SiO_2$) distributed uniformly within a glassy matrix. If the batch contains alumina as such, in relatively coarse particles, such as 100-mesh, crystals of corundum will be formed. On account of the small quantity of iron and alkalies present in the starting materials, the glassy matrix is exceedingly viscous and has a softening point which may be as high as 3000° F., or even higher. The grog material thus produced is ground to sufficient fineness for assembly in a final body, suitably by passing it through a jaw crusher and then through a roller mill. The grog may be ground to a fineness at which the largest particles are able to pass through a 12-mesh screen, which will give a desirable quantity of smaller particles and fines. The grog may be ground somewhat coarser or finer than 12-mesh as may be desired.

*4. Final assembly.*—The grog prepared as stated above is mixed with a suitable proportion of raw material, which may be of the same composition as the starting material for the grog or may vary from this composition, provided only that the added raw material must be similar in type to the materials already mentioned for the grog and must be within the analytical limits mentioned above, namely, about 96% or upward, by calcined analysis, of alumina plus silica, and not over about 1½%, by calcined analysis, of iron oxid and alkali metal oxids. It is preferred that at least 50% of the final assembly be composed of grog, and this amount may be very largely increased to control and minimize the shrinking of the final objects during firing. The grog and the raw added material are mixed thoroughly, but at this stage it is not necessary to carry out the mixing in the presence of water.

*5. Pressing.*—The assembled material is formed into the blocks, bricks, or other objects desired, by a process of dry-pressing. That is to say, the material, when pressed, should contain not over 12% of water and from 5% to 7% of water is commonly present in the material at this stage. Such material appears dry to the touch. The degree of pressure employed varies in accordance with the desired density of the final products. It may be one ton or less per square inch for bricks or other objects that are to be relatively porous, and from one to five tons or more per square inch for glass tank blocks and the like that are to be made very dense.

The dry-pressing practice employed here differs from any procedure heretofore employed in pressing refractory materials, in that the mold in which each object is formed is free to move or "float" in the direction in which the pressure is applied. Thus, if the mold is a rectangular metal box arranged between pressing plates which approach each other vertically, the mold or box is free to "float" up or down, thus minimizing friction between the walls of the mold and the material being molded, and enabling the production of uniform compactness in all parts of the mold.

The dry-pressing practice is also characterized by the fact that the pressure is preferably applied in two or more stages, between which the pressure is relieved and the air initially present in the material is allowed to escape through the channels naturally present in materials of this kind. When three stages of pressure are employed, these may be a pressure of 500 pounds per square inch, followed after intervals of relief by pressures of 1000 to 1500 pounds and 2000 pounds or more.

The use of these two features, the "floating box" and the application of pressure in two or more stages, enables the production of dry-pressed objects from refractory materials of far greater thickness than the art heretofore has considered possible to make by dry-pressing. Heretofore it has been thought impossible to dry-press objects more than about four inches in thickness, but by the practice outlined above, it has been found entirely feasible to dry-press objects, such as tank blocks for glass furnaces, as large as 10" x 12" x 18", and even larger.

*6. Firing.*—The pressed objects, which ordinarily are quite fragile, inasmuch as but little plastic material need be incorporated in them, are fired at a temperature of at least 2700° F. for a sufficient time to bring all parts of the objects to the firing temperature. At these temperatures, which are much higher than the temperatures ordinarily employed in making fire bricks and glass refractories, the raw material or binder, with which the grog is mixed, undergoes the same sort of transformation which was produced in the grog when it was initially fired. That is to say, the mass is transformed into a uniform body consisting of numerous microscopic crystals, typically mullite, distributed very uniformly in a highly viscous glassy matrix. Also, it is characteristic of this type of material that the identity of the original starting materials is entirely destroyed. The final products usually consist of two phases only, mullite and glass. The impurities contained in the original starting materials, of which iron and alkalies have the most important effect on the life of the products, are concentrated in the glass, but on account of the initially low proportion of these impurities in the starting materials, the glass is extremely viscous, being composed largely of silica.

*Examples of batch formulas.*—As examples of the numerous batch mixtures with which this invention may be practiced, two formulas are given below, one for a material which has been found very desirable for contact with molten glass, known as "No. 901DB", which is relatively high in silica and which is described and specifically claimed in my application Serial No. 430,459, identified above; and the other for a desirable material for general refractory use known as "No. 10", which is relatively high in alumina and is described and specifically claimed in my application Serial No. 294,601, identified above.

For the "No. 901–DB" glass refractory, the starting materials may be a non-plastic kaolin, such as the Georgia Klondike white kaolin mentioned above; a less quantity of a plastic bond clay such as the Georgia G¹ kaolin mentioned above; and a still less quantity of feldspar such as that obtained from a deposit at Bedford Hills, New York. Both the grog and the added raw material or binder may consist of these starting materials in the proportions of about 62.5% of the nonplastic kaolin, about 30% of the plastic bauxitic clay, and about 7.5% of the feldspar. The grog and the binder may be mixed in the proportions of about 65 parts of grog and about 35 parts of the binder. The final pressing pressure may be of the order of one to two tons per square inch, and the firing temperature may be of the order of 2850° F.

For the "No. 10" general-duty refractory, the starting materials may be white bauxite, the Georgia Klondike white kaolin and Georgia G¹ clay mentioned above. Suitable proportions of the starting materials for the grog and for the binder are 128 parts of the bauxite, 87 parts of the Georgia Klondike kaolin and 21 parts of the Georgia G¹ clay. The grog and the binder may be mixed in the proportions of about 60 parts of the grog and 40 parts of the binder. The pressing pressure may be somewhat less than that used for the glass refractory just described, and the firing temperature may be of the order of 2850° F.

When the objects to be fired are of considerable size, as for instance tank blocks for glass furnaces, it is preferred to fire the objects upon pallets or other supports of material which, during the firing, will shrink at least as much as the objects themselves, thus producing square corners at the bottoms of the blocks, which otherwise would shrink less than the upper parts of the blocks, producing unequal dimensions which would have to be corrected by grinding the blocks, at considerable expense. This particular method of firing blocks on shrinking pallets is described and claimed in my Patent No. 1,626,260, granted April 26, 1927. In firing smaller objects, such as bricks, it is sufficient to pile them one upon another, in which case each brick serves as a shrinking pallet for the brick above it, and the lower course of bricks, which will exhibit unequal shrinkage, may be broken up and used as grog in a subsequent assembly. Likewise, the shrinking pallets employed in firing the larger objects may be of suitable composition to serve as grog in a subsequent assembly and may be used for this purpose.

By the above process it is possible to produce refractory bodies of much greater bulk density than can be made from like materials by ordinary processes. This results from the higher firing temperatures employed, which give greater inherent density, and also from the high pressures under which the products are molded, which packs more material into the mold than can be put in by ordinary wet molding methods.

The system of manufacture described herein is of general application within the limits stated, and is to be regarded as a novel combination of process steps, regardless of the novelty per se of the individual steps composing the process.

I claim:

1. A process of making refractory objects which comprises grinding to impalpable fineness natural starting material, at least approximately 96% of which is composed, on dry analysis, of silica and alumina accompanied by not more than 1½% of iron oxid and alkalies, forming a grog material by intimately mixing the impalpably fine starting material in the presence of water, calcining the grog material to a temperature at least as high as 2700° F., breaking down the calcined material to form grog, mixing the grog with raw material of the above-stated composition, pressing the assembled material into objects in the presence of not more than 12% of water, the pressing pressure being applied in a plurality of stages between which the pressure is relieved, and the material being contained, while being pressed, in a mold which is free to float in the line of the application of pressure, and subjecting the said objects to a temperature at least as high as 2700° F. for a sufficient time to bring the whole mass of each object to the firing temperature, thus developing, within said objects, microscopic crystals, typically of aluminum silicate, accompanied by a highly viscous glassy matrix, and destroying the original identity of the starting materials.

2. A process of making refractory objects which comprises grinding to impalpable fineness natural starting material, at least approximately 96% of which is composed, on dry analysis, of silica and alumina accompanied by not more than 1½% of iron oxid and alkalies, forming a grog material by intimately mixing the impalpably fine starting material in the presence of water, calcining the grog material to a temperature at least as high as 2700° F., breaking down the calcined material to form grog, mixing the grog with raw material of the above-stated composition, pressing the assembled material into objects in the presence of not more than 12% of water, the pressing pressure being applied in a plurality of stages between which the pressure is relieved, and the material being contained, while being pressed, in a mold which is free to float in the line of the application of pressure, placing the pressed objects upon supports which, when fired to a temperature in excess of 2700° F., will shrink at least as much as the objects themselves, and subjecting the said objects, while on said supports, to a temperature at least as high as 2700° F. for a sufficient time to bring the whole mass of each object to the firing temperature, thus developing, within said objects, microscopic crystals, typically of aluminum silicate, accompanied by a highly viscous glassy matrix, and destroying the original identity of the starting materials.

Signed at London, England, this 13th day of August, 1930.

PAUL G. WILLETTS.